INVENTORS
CARL IDDINGS
GEORGE S. SIMPSON
ATTORNEY

Patented May 4, 1937

2,079,017

UNITED STATES PATENT OFFICE 2,079,017

APPARATUS FOR HEATING MATERIALS

Carl Iddings, Staten Island, N. Y., and George S. Simpson, Plainfield, N. J., assignors to General Chemical Company, New York, N. Y., a corporation of New York Application October 18, 1933, Serial No. 694,107

4 Claims. (Cl. 23—277)

This invention relates to a retort for the production of carbon bisulfide by the reaction of carbon and sulfur. The reaction between carbon and sulfur to form carbon bisulfide is endothermic and one of the major problems in connection with the conduct of this reaction is that of supplying to the reactants the heat necessary for maintaining the elevated temperatures required for the reaction.

It is an object of this invention to provide a novel retort which may be externally heated and the heat effectively transferred to a bed of carbon within the retort into which sulfur is introduced for reaction with the carbon. It is a further object of this invention to provide a metal retort of a construction particularly adapted to insure a long life for the retort when operated at the high temperatures required despite the tendency for metallic vessels to deteriorate under the conditions present in manufacturing carbon bisulfide.

The retort of this invention comprises a metal vessel provided on its interior with a plurality of fins extending from the walls of the vessel inwardly towards the interior and serving to conduct heat applied to the exterior of the vessel into and distribute it throughout a body of carbon charged into the vessel and filling the spaces therein between the fins.

Figure 1:
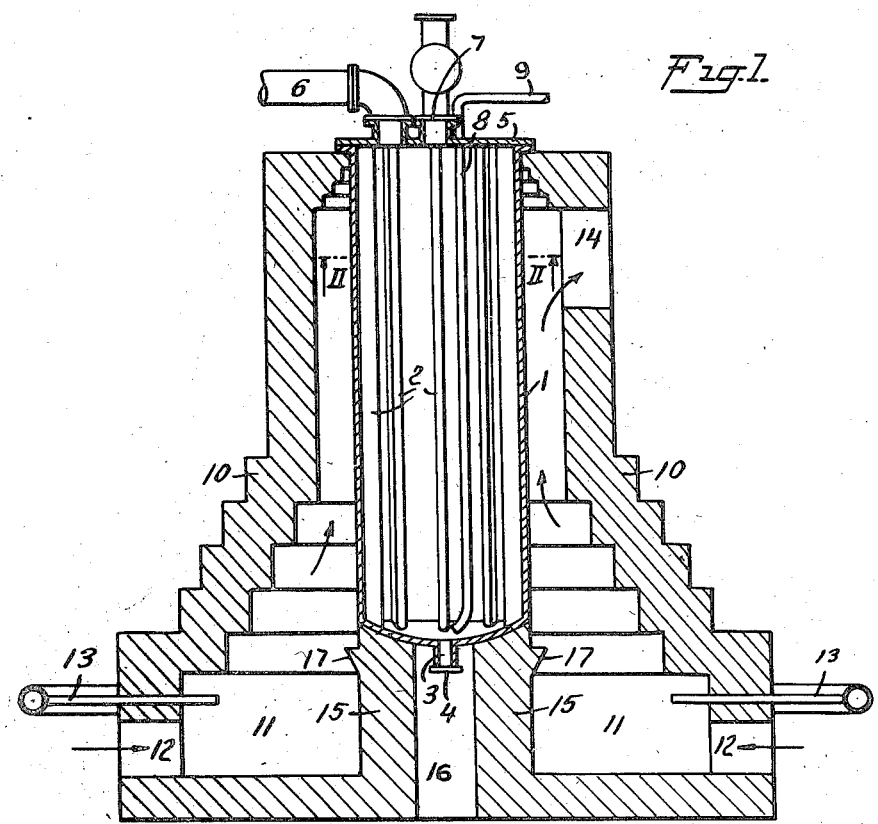

The accompanying drawing illustrates one example of the novel retort of this invention. In the drawing Fig. 1 is a vertical section of a retort in its setting arranged for the external heating of the retort, and Fig. 2 is a cross-section of the retort shown in Fig. 1 taken along the line II—II.

Figure 2:
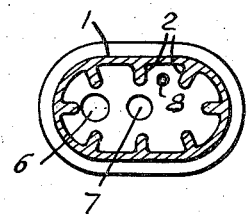

Referring to the drawing, retort 1 is a vertically elongated vessel having an elliptical cross-section as shown in Fig. 2. The interior walls of the retort are provided with a plurality of vertically extending fins 2 which, like the walls of the retort, are of a metal and thus readily conduct heat. The fins are preferably formed integrally with the walls of the retort. The bottom of the retort is provided with an opening 3 closed by a removable cover plate 4 by removing which ash collecting in the bottom of the retort may be extracted. The top of the retort is closed by a cover plate 5 which is provided with a vapor outlet pipe 6 for the withdrawal from the retort of carbon bisulfide vapors and an inlet 7 through which carbon, preferably in the form of charcoal, may be introduced into the retort. A pipe 8 depends from cover plate 5 and passes downwardly adjacent the wall of the retort to the bottom of the retort terminating in an open end near the center of the bottom of the retort. Pipe 8 is in communication with a pipe 9 through which molten sulfur or sulfur vapors may be introduced into the bottom of retort 1 for reaction with the carbon therein.

Retort 1 is mounted on a pier of refractory brickwork 15 having a central opening 16 through which access may be had to the discharge opening 3. The retort is surrounded by a brickwork setting 10, the bottom portion of which constitutes a combustion chamber 11 into which air, which is preferably preheated, is introduced through inlets 12 for the combustion of an oil introduced through burners 13. Pier 15 is of sufficient height that it forms a target against which the flames from burners 13 impinge and hold the retort out of direct contact with the flame. The hot products of combustion pass upwardly within setting 10 through the duct about the outside of retort 1 serving to heat the retort and its contained bed of carbon and pass out of the setting through outlet 14. Offsets 17 near the top of the pier aid in directing the flames away from the bottom of the retort into the enlarged portion of the duct around the top of the pier and the bottom portion of the retort.

The novel retort of this invention is peculiarly adapted for use in carrying out the reaction between carbon and sulfur. As noted above, the reaction between carbon and sulfur to form carbon bisulfide is endothermic and, accordingly, requires the transfer to the bed of carbon of large quantities of heat at a high temperature in order to maintain proper reaction temperatures. The carbon itself is of relatively low heat-conducting capacity. By providing fins of a metal of high heat-conducting capacity which extend from the walls of the retort into the bed of carbon, the distribution of the heat throughout the carbon is facilitated and the bed may be maintained throughout at suitable temperatures. The conditions to which a carbon bisulfide retort are subjected in operation are conducive to a rapid destruction of the retort by the high temperatures and corrosive action of the gases, to which the retort is exposed. The destructive action of these conditions upon the retort is particularly effective upon the outer surfaces of the retort which are exposed directly to contact with the hot products of combustion used for the heating. The retort of this invention has a relatively long life yet permits of efficiently heating the carbon bed, because it has a minimum surface exposed to the destructive action of the hot gases of combustion while, on the other hand, the interior surfaces of the vessel from which the heat must be dispersed to the bed of carbon are of relatively large area. This combination of small exterior surface and extended interior surface minimizes the effect of the destructive action of the hot gases of combustion and facilitates the transfer of heat to the bed of carbon.

Furthermore, by providing a refractory target against which the flame of burning gases impinges and which prevents the flame directly contacting with the outside of the retort, the destructive action of a flame on the retort walls is prevented, thus materially contributing to the life of the retort.

Numerous changes and modifications in the particular retort described above as illustrative of this invention may be made without departing from the scope thereof.

We claim:

1. In an apparatus for carrying out the reaction between carbon and sulfur to form carbon bisulfide a combustion chamber, a pier of refractory material within the combustion chamber having a central opening, a burner arranged for projecting a flame of combustible material into said chamber and against the side of said pier, a retort positioned on said pier out of contact with said flame, said retort comprising a metallic vessel having upon its interior surfaces a plurality of fins extending into the interior of the vessel, means for conducting the hot products of combustion from said flame about the exterior of said retort and a discharge opening provided with a closure on the bottom of the retort within the aforesaid central opening of the pier.

2. In an apparatus for carrying out the reaction between carbon and sulfur to form carbon bisulfide, a combustion chamber, a burner arranged for projecting a flame of combustible material into said chamber, a pier of refractory material within said chamber forming a target for said flame and having a central opening, offsets on the pier above the point at which the flame impinges on the pier to direct the flame away from the top of the pier, a retort positioned on said pier so as to be out of contact with the flame, said retort comprising a metallic vessel having upon its interior surfaces a plurality of fins extending into the interior of the vessel, a duct for conducting the hot products of combustion of said flame about the exterior of said retort, said duct being formed by the walls of said chamber and the exterior surfaces of said pier and said retort, said walls of the chamber being widely spaced apart at their bottom portions and converging to form with the upper exterior surface of the retort a relatively narrow portion of said duct, the converging portions of said walls forming with the upper exterior surface of the pier and the lower exterior surface of the retort an enlarged portion of the duct, means for supplying solid material to the vessel, a vapor outlet from the vessel, and a discharge opening provided with a closure on the bottom of the retort within the aforesaid central opening of the pier.

3. In an apparatus for carrying out the reaction between carbon and sulfur to form carbon bisulfide, a combustion chamber, a pier of refractory material within the combustion chamber having a central opening, a burner arranged for projecting a flame of combustible material into said chamber and against the side of said pier, a metallic retort positioned on said pier out of contact with said flame, means for conducting the hot products of combustion from said flame about the exterior of said retort, and a discharge opening provided with a closure on the bottom of the retort within the aforesaid central opening of the pier.

4. In an apparatus for carrying out the reaction between carbon and sulfur to form carbon bisulfide, a combustion chamber, a burner arranged for projecting a flame of combustible material into said chamber, a pier of refractory material within said chamber forming a target for said flame, offsets on the pier above the point at which the flame impinges on the pier to direct the flame away from the top of the pier, a retort positioned on said pier so as to be out of contact with the flame, said retort comprising a metallic vessel having upon its interior surfaces a plurality of fins extending into the interior of the vessel, a duct for conducting the hot products of combustion of said flame about the exterior of said retort, said duct being formed by the walls of said chamber and the exterior surfaces of said pier and said retort, said walls of the chamber being widely spaced apart at their bottom portions and converging to form with the upper exterior surface of the retort a relatively narrow portion of said duct, the converging portions of said walls forming with the upper exterior surface of the pier and the lower exterior surface of the retort an enlarged portion of the duct, means for supplying solid material to the vessel, and a vapor outlet from the vessel.

CARL IDDINGS.
GEORGE S. SIMPSON.